Figure 14:
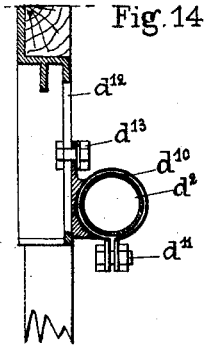

H. H. PAGNY.
AEROPLANE.
APPLICATION FILED DEC. 5, 1912.
1,099,762.
Patented June 9, 1914.
13 SHEETS—SHEET 1.
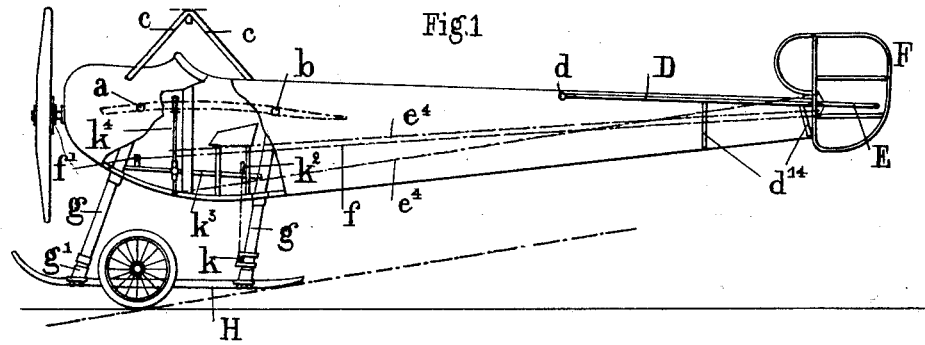
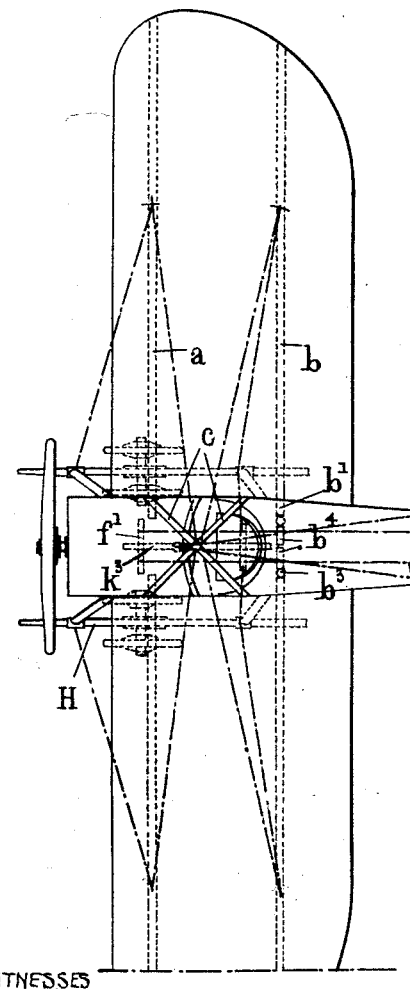
INVENTOR
Henri Hubert Pagny
BY
Howson and Howson
his ATTORNEYS
WITNESSES
L. H. Grote
M. G. Kerr

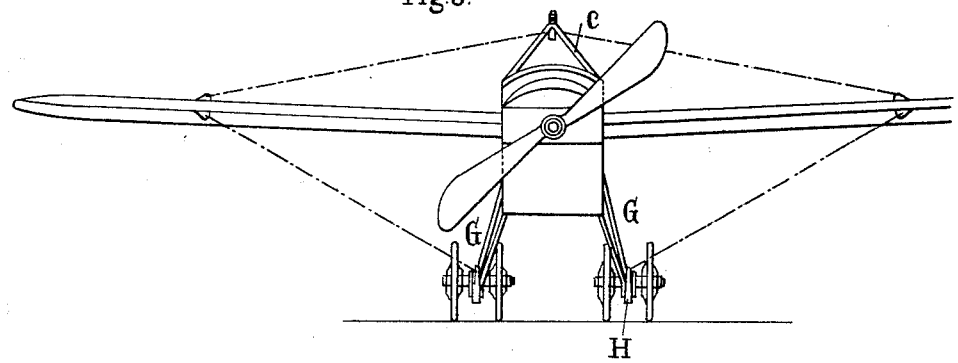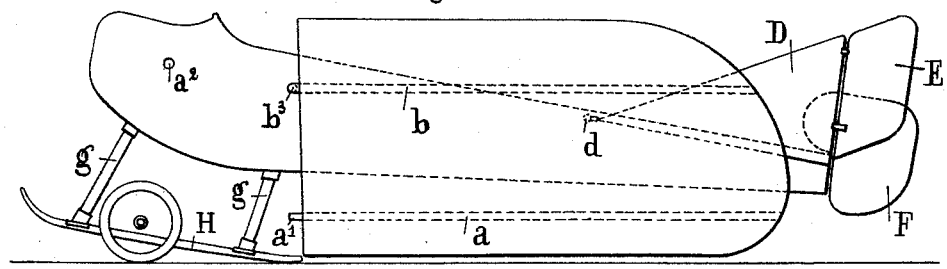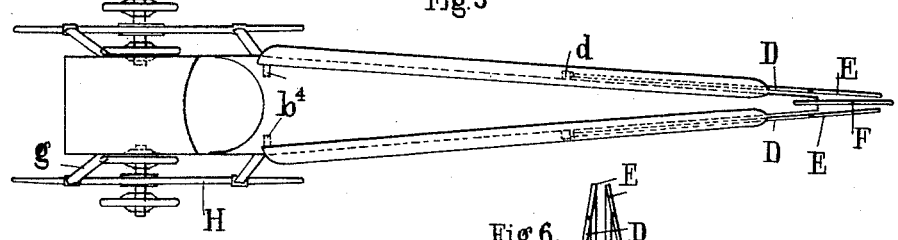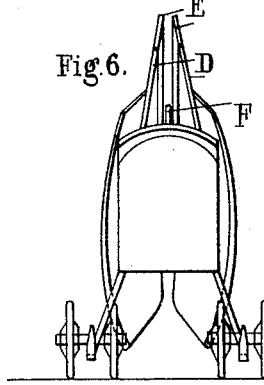

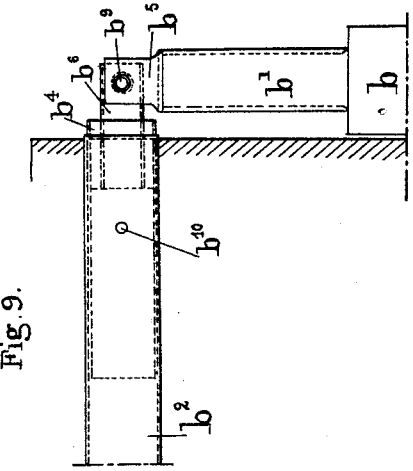
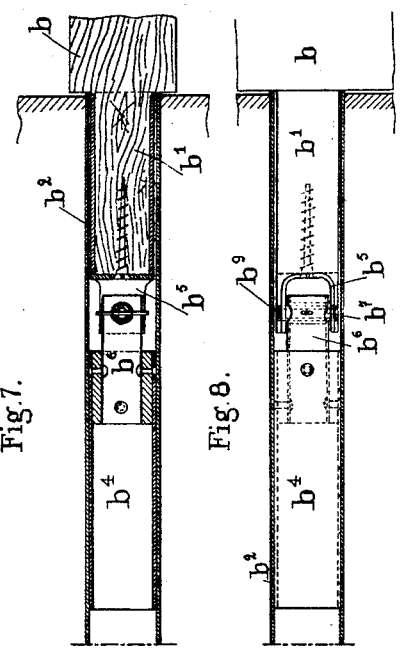

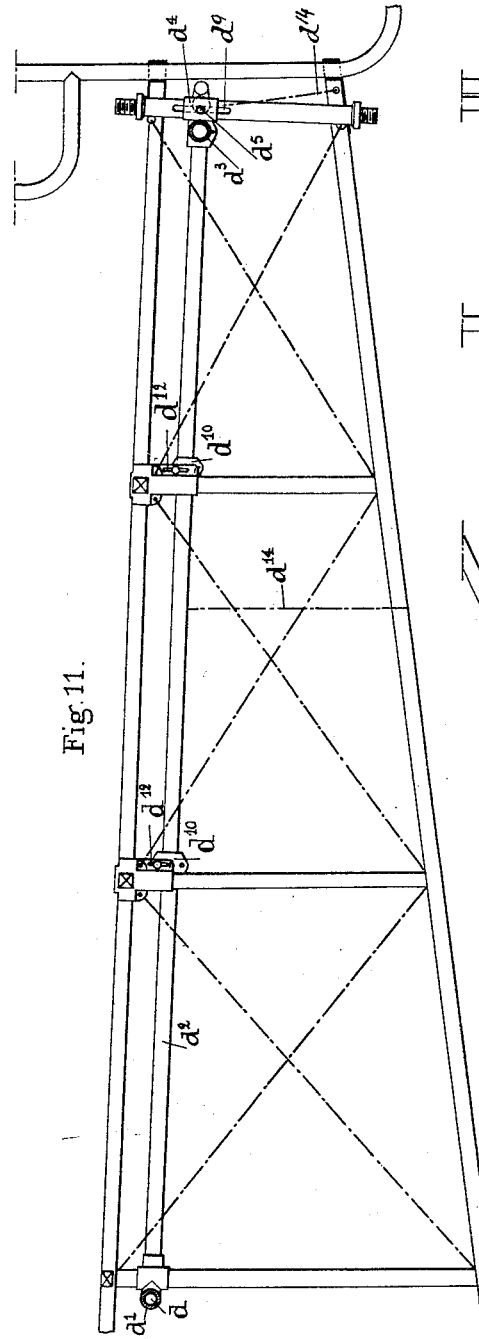
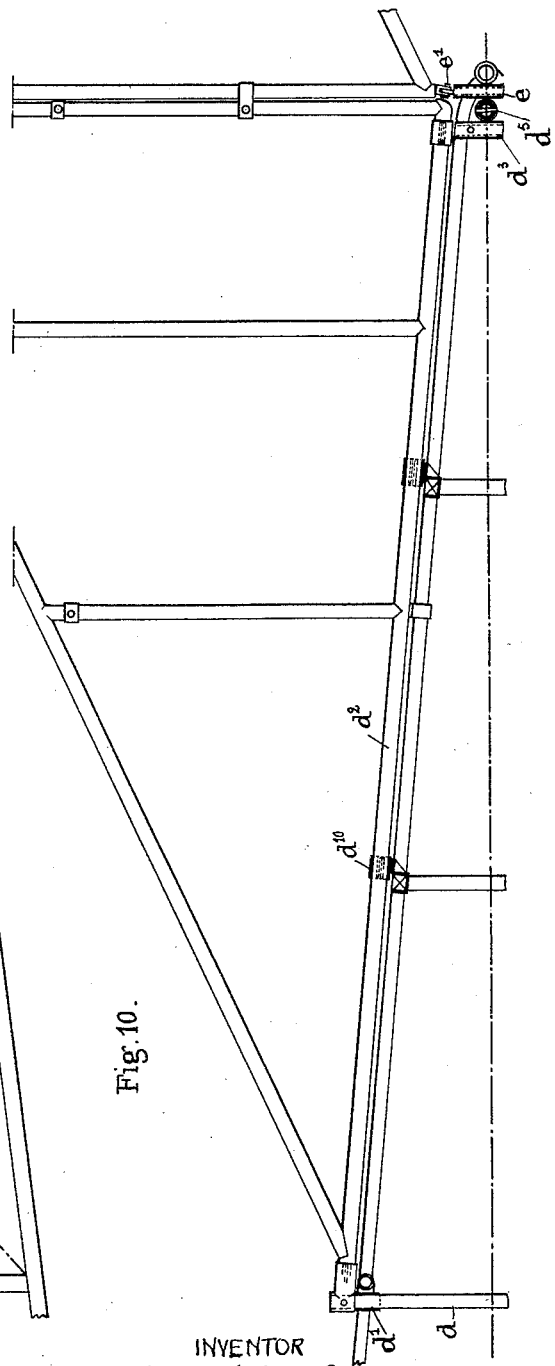

H. H. PAGNY.
AEROPLANE.
APPLICATION FILED DEC. 5, 1912.

1,099,762.

Patented June 9, 1914.
13 SHEETS—SHEET 5.

WITNESSES
L. H. Grote
M. E. Kiss

INVENTOR
Henri Hubert Pagny
BY
Howson and Howson
his ATTORNEYS

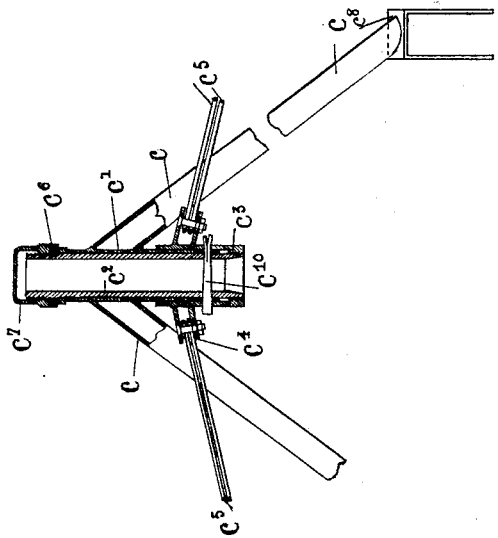
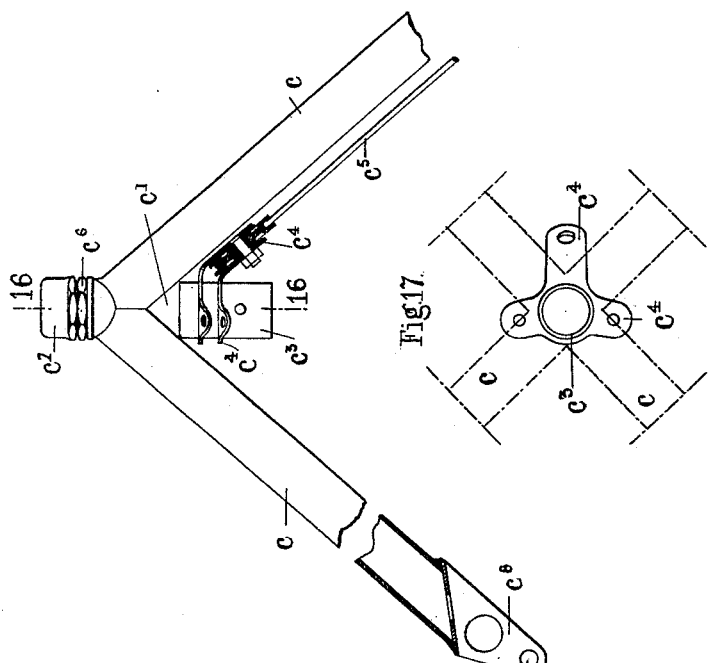

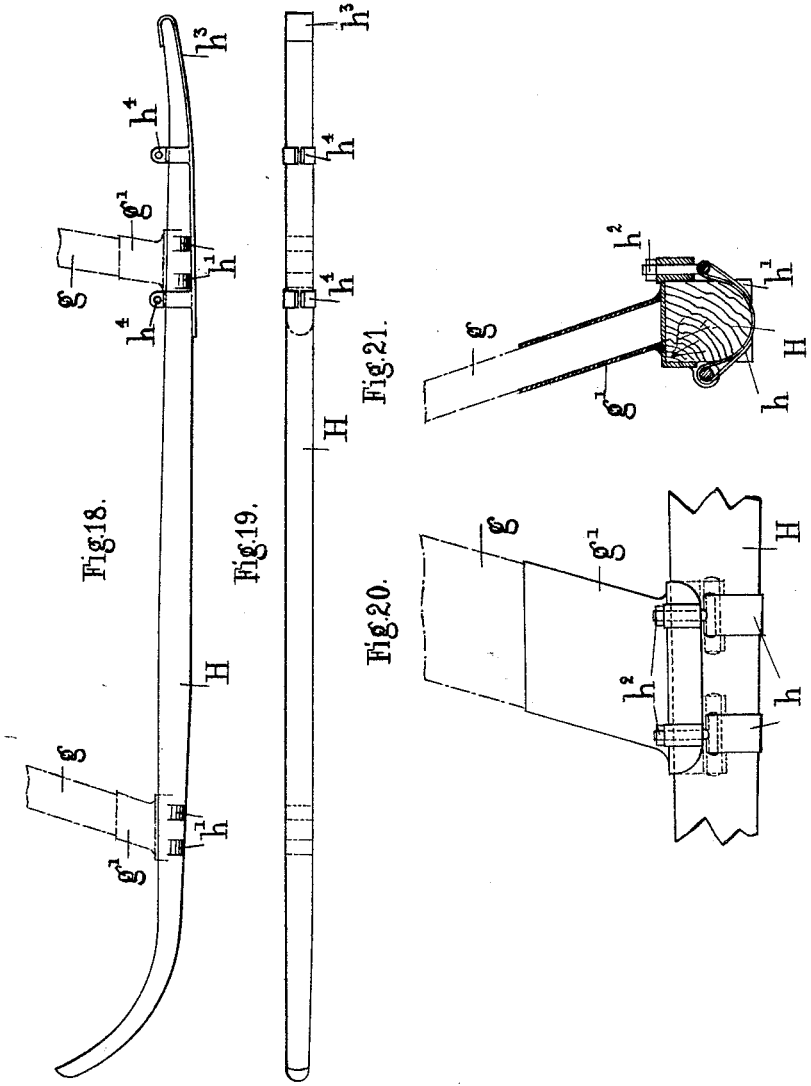

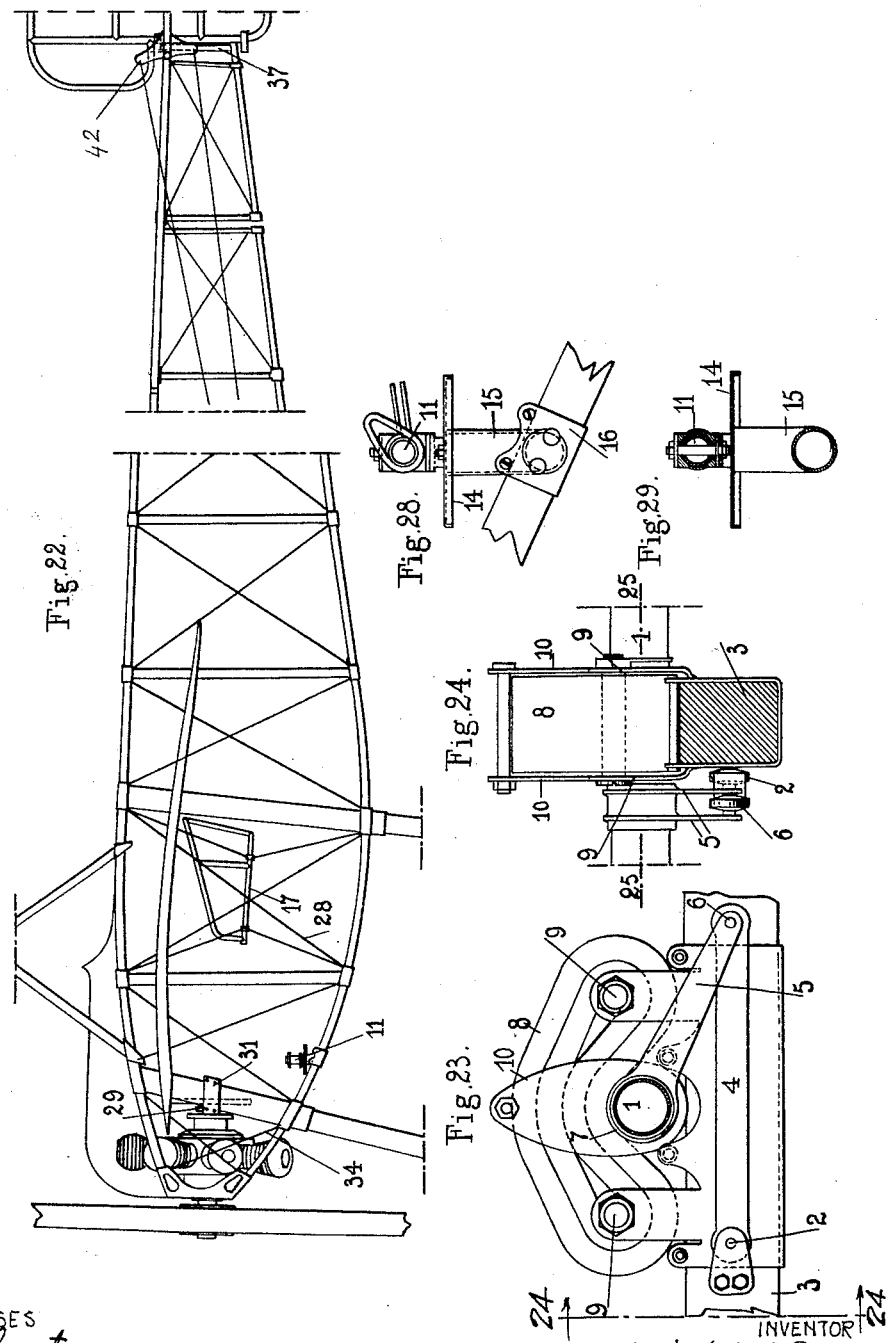

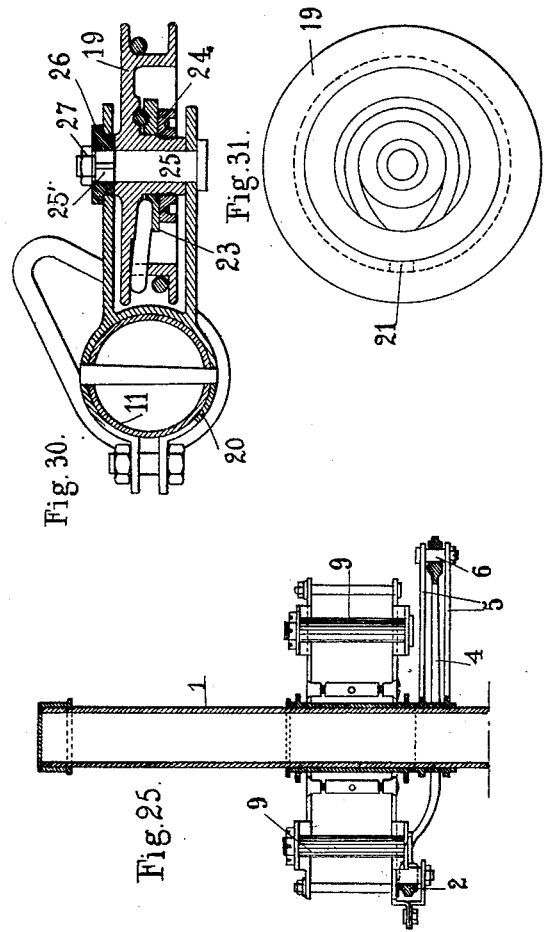

H. H. PAGNY.
AEROPLANE.
APPLICATION FILED DEC. 5, 1912.

1,099,762.

Patented June 9, 1914.
13 SHEETS—SHEET 10.

WITNESSES

INVENTOR
Henri Hubert Pagny
by Howson and Howson
his Attorneys

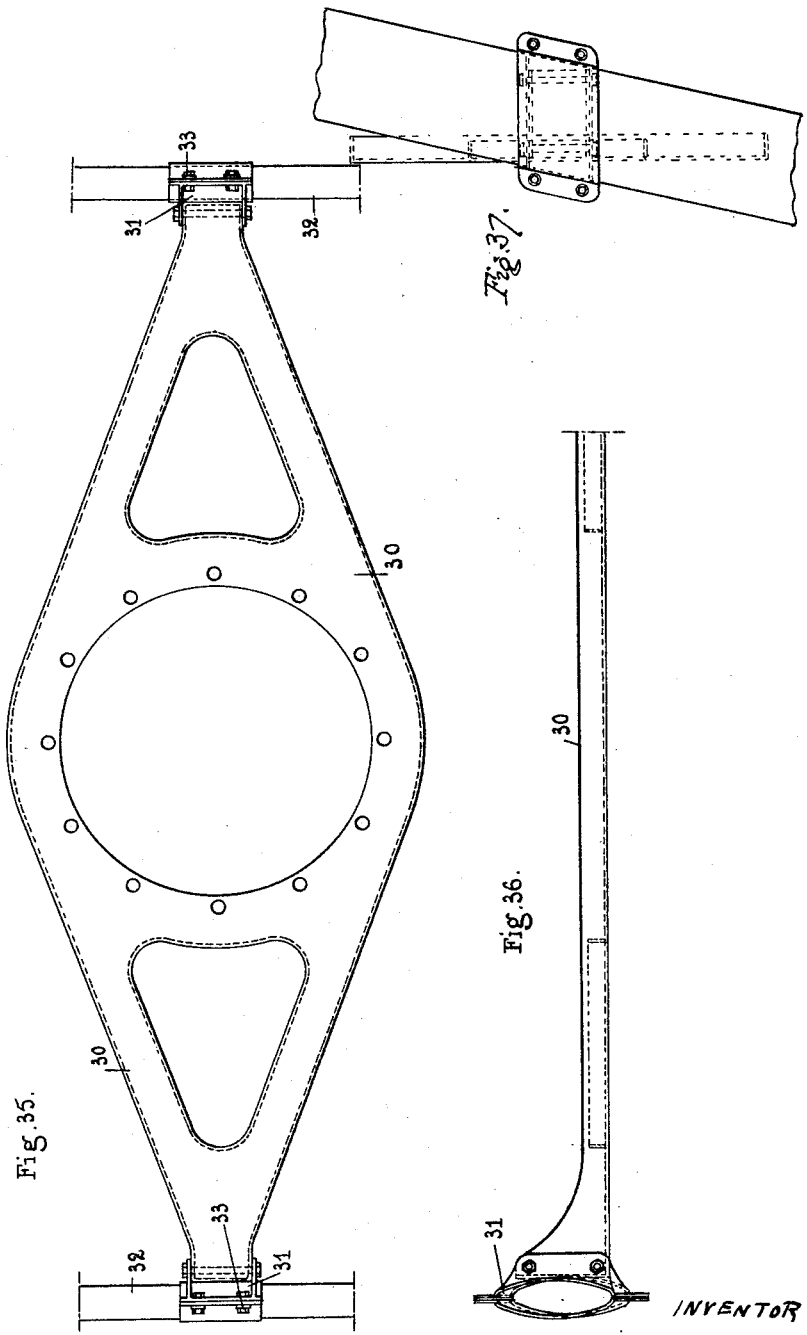

H. H. PAGNY.
AEROPLANE.
APPLICATION FILED DEC. 5, 1912.
1,099,762.
Patented June 9, 1914.
13 SHEETS—SHEET 12.
Fig. 38.
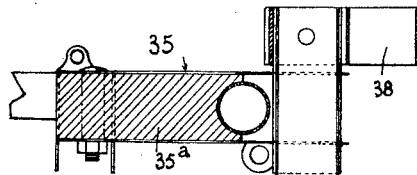
Fig. 41.
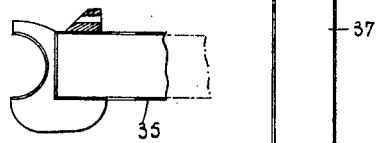
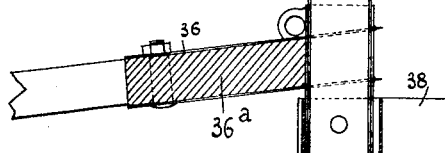
Fig. 40.
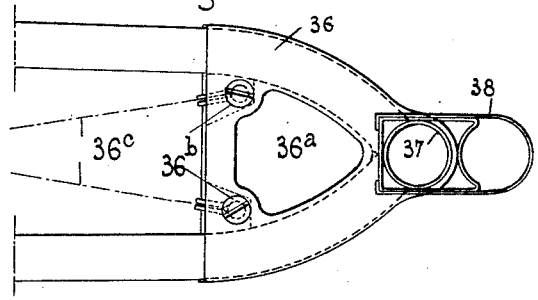
WITNESSES
L. H. Grote
M. E. Kiss
INVENTOR
Henri Hubert Pagny
by Howson and Howson
his Attorneys

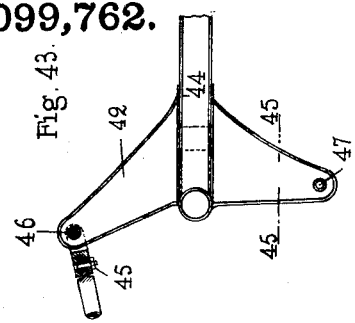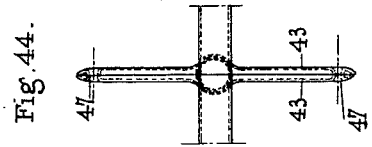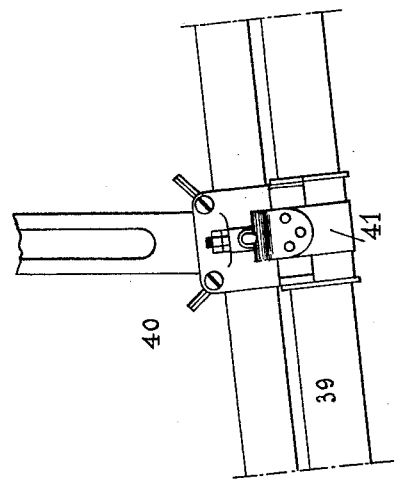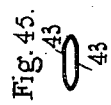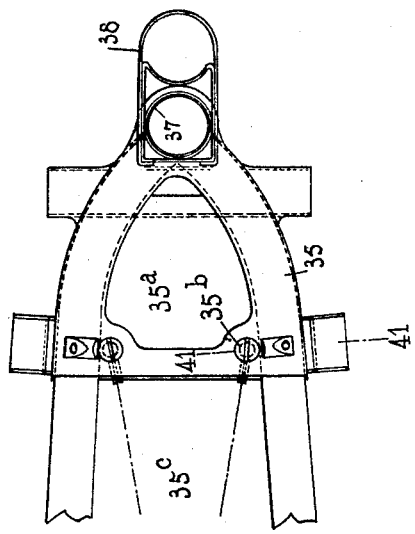

UNITED STATES PATENT OFFICE.

HENRI HUBERT PAGNY, OF RHEIMS, FRANCE, ASSIGNOR TO SOCIÉTÉ ANONYME DES APPAREILS D'AVIATION HANRIOT, OF RHEIMS, FRANCE.

AEROPLANE.

1,099,762.  Specification of Letters Patent.  Patented June 9, 1914.

Application filed December 5, 1912. Serial No. 735,127.

*To all whom it may concern:*

Be it known that I, HENRI HUBERT PAGNY, a citizen of the Republic of France, and a resident of 3 Rue du Cloître, Rheims, France, have invented a new and useful Aeroplane, of which the following is a specification.

Figure 13:
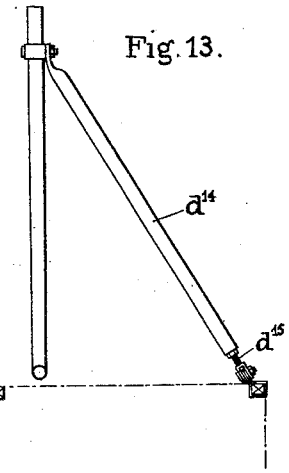
Figure 12:
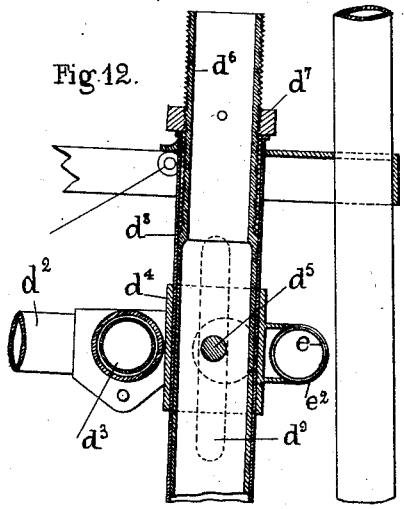
Figure 26:
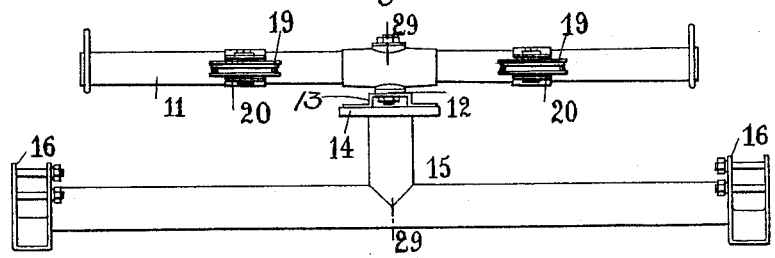
Figure 27:
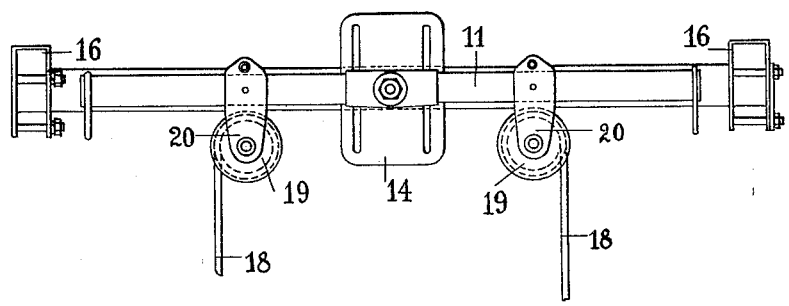
Figure 32:
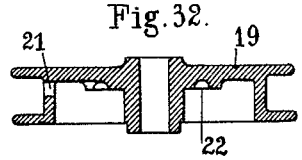
Figure 33:
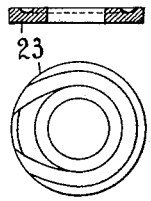
Figure 34:
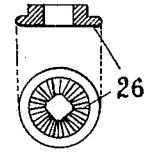

This invention consists of an improved aeroplane having the following characteristics:—(1) In order to allow the folding of the wings longitudinally of the fuselage for transport, the spars of the wings are merely fitted in sockets and one of them is hinged to a plug adapted to slide and revolve in the socket in such a way that for the folding operation it is only required first to draw the wing horizontally away from the fuselage so as to release the spars from their sockets, and then either to turn the wing through ninety degrees around a horizontal axis perpendicular to the plane of symmetry of the apparatus, the wing being afterward folded along the fuselage by turning it around a vertical axis, or else to turn the wing upward around a horizontal axis parallel to the plane of symmetry, the wing being afterward turned about a horizontal axis perpendicular to the preceding so as to place it along the fuselage; (2) the upper shrouds of the wings are mounted in such a way that the wings can be folded without it being necessary to alter the length of the shrouds, and the adjustment of the latter can, therefore, be easily reset with certainty in the new position; (3) the empennage or tail-piece is of variable and adjustable inclination, and can, moreover, be folded along the fuselage of the apparatus during transport; (4) the altitude rudders are interconnected; (5) the apparatus is supported by two independent frames, easily detachable, not projecting laterally of the fuselage, and not having any parts capable of injuring the fuselage in case of accidental breakage in landing; (6) the method of connecting the different parts allows of not cutting through the timbers and therefore of not weakening them; (7) the cushioning device connecting the axles of the wheels to the landing skids; (8) the adjustable regulation of the foot-rail controlling the steering rudder; (9) the suspension of the pilot's seat; (10) the control of the inclination of the engine; (11) the levers of the rudders and the bracket connecting at the rear to the longitudinal members of the fuselage. An aeroplane provided with these characteristics is represented by way of example upon the annexed drawings which show:

Figure 1 a side view of the apparatus. Fig. 2 a plan. Fig. 3 an end view from the front. Figs. 4, 5 and 6 views of the apparatus folded for transport, corresponding to Figs. 1, 2 and 3. In the remaining figures which are drawn on a larger scale, Fig. 7 represents in section a detail of the fitting of the hinged spar or longitudinal member of the wing. Fig. 8 is a part section of the same at right angles to the preceding view. Fig. 9 is an elevation corresponding to Fig. 7, the wing being folded. Fig. 10 is a plan of a part of the rear empennage or tail-piece. Fig. 11 is a corresponding elevation. Fig. 12 shows in section on a larger scale, a detail of the device for allowing the inclination of the empennage to be altered. Fig. 13 shows a reinforcing rod connecting the empennage to the fuselage. Fig. 14 shows the detail of the connection of the tubes of the empennage to the longitudinal members of the fuselage. Fig. 15 represents the device for securing the upper shrouds upon the cabane or upper triangular frame. Fig. 16 is a section upon line 16—16 of Fig. 15. Fig. 17 is a plan view of a part of Fig. 15. Figs. 18 and 19 show in elevation and in plan the device for attaching the frames to the landing skids. Figs. 20 and 21 show on a larger scale in elevation and in section the detail of this device. Fig. 22 an elevation of the apparatus, and on a larger scale. Fig. 23 an elevation of the cushioning device connecting the axle of the wheels to the landing skids. Fig. 24 a section on line 24—24 of Fig. 23 seen from the right. Fig. 25 a section on line 25—25 of Fig. 24. Fig. 26 an elevation of the foot rail and its support. Fig. 27 a plan view corresponding with Fig. 26. Fig. 28 a side view corresponding with Fig. 26. Fig. 29 a section on line 29—29 of Fig. 26. Fig. 30 a section on a larger scale of one of the attachments for the controlling cables of the steering rudder. Figs. 31, 32, 33 and 34 detail views of the construction. Fig. 35 an elevation of the cross piece supporting the rear bearing for the motor. Figs. 36 and 37 corresponding views in plan side elevation. Fig. 38 a sectional elevation of the extreme rear part of the fuselage upon which is mounted the steering rudder.

Fig. 39 a plan view of the upper assemblage socket. Fig. 40 a plan view from the underside of the lower socket. Fig. 41 a section on line 41—41 of Fig. 39. Fig. 42 detail of the connecting collars for the lower tubes with the rear empennage. Fig. 43 a section of the lever to which are connected the cables controlling the altitude rudder. Fig. 44 a view of the left of Fig. 43. Fig. 45 a section on line 45—45 of Fig. 43.

The front spars $a$ of the wings of the apparatus have their extremities $a'$ merely fitted in sockets $a^2$ integral with or secured to the body of the fuselage, while the rear spars $b$, having their extremities $b'$ also fitted in sockets $b^2$, are connected by hinges or joints $b^3$ to plugs $b^4$ capable of sliding and revolving in the sockets. The detail of this connection is shown in Figs. 7 and 8; the extremities $b'$ of the spar is provided with a forked shoe or ferrule $b^5$ which embraces a tenon $b^6$ integral with the plug $b^4$ and provided with a hole $b^7$ for the spindle $b^9$. A pin fitting in a hole $b^{10}$ fixes the plug $b^4$ in its socket when the wing is folded (Fig. 9). This arrangement allows the wings to be folded in the following manner: First the wing is moved horizontally outward from the fuselage so as to release the extremities $a'$ and $b'$ as well as the hinge $b^3$ from their sockets; the wing may then be either turned through ninety degrees around the axis of the rear spar and afterward folded along the fuselage by movement around the pivot $b^9$ of the hinge $b^3$, or else folded upward by rotation through ninety degrees around the pivot $b^9$ of the hinge $b^3$ and afterward brought down alongside the fuselage by rotation around the axis of the socket $b^2$. When folded in this manner the wings occupy the position represented in Figs. 4, 5 and 6.

Since the hinge-devices described can all be inclosed completely within the body of the apparatus, the wings can be arranged as close to the fuselage as in an ordinary apparatus. Moreover, this arrangement is very simple, very strong and quite independent of the wing and fuselage proper. These movements of the wings can be effected without it being necessary to alter the adjustment of the upper shrouds. Figs. 15, 16 and 17 show how this result may be obtained. The upper ends of the standards $c$ of the cabane are connected for example by autogenous soldering to a tube $c'$ in which a second tube is adapted to slide; upon the second tube externally of the tube $c'$ there is screwed a socket $c^3$ carrying the yokes $c^4$ for the attachment of the shrouds $c^5$. The top of the tube $c^2$ is screwed and provided with a nut $c^6$ and a cap $c^7$ forming a lock-nut. In order not to weaken the longitudinal members of the fuselage, the standards of the cabane terminate at their lower ends in caps $c^8$ clamped by bolts at $c^9$, the bolts not passing through the material of the frame-member. These caps meet the standards of the frames forming the landing carriage. When the parts are in the position shown in Fig. 16, the length of the shrouds is adjusted once and for all, and a hole is then drilled through the tubes to receive the pin $c^{10}$. When the wings are to be folded, this pin $c^{10}$ is removed, the cap $c^7$ and nut $c^6$ are unscrewed, and the tube $c^2$ with the shroud is withdrawn. For refitting it is only necessary to proceed in the inverse manner, the shrouds having exactly the same position when the pin $c^{10}$ is reinserted in place. The shrouds may be adjusted afresh provided other holes are drilled for the pin $c^{10}$ or by means of the usual tensioning devices.

The empennage of the apparatus consists of two planes D formed of tubular frames; these two planes are connected at their front end by a tube $d$ (Figs. 10 and 11) which is revoluble in supports $d'$ integral with the fuselage, and at their rear ends by a tube $d^3$ integral with a socket $d^4$. The latter, as shown in Fig. 12, is connected by a pin $d^5$ to a tube $d^6$ the screw-threaded extremities of which are fitted with nuts $d^7$; this tube is adapted to slide in a tube $d^8$ integral with the fuselage and in which is formed a long slot $d^9$ for the passage of the pin $d^5$. The tubes $d^2$ of the planes D are connected to the fuselage by collars $d^{10}$ (Fig. 14) in which they may either revolve or be clamped by means of bolts $d^{11}$. These collars are adapted to slide along ways $d^{12}$ upon which they may be clamped by bolts $d^{13}$. These planes D are also connected to the fuselage by means of struts $d^{14}$ the length of which may be adjusted by means of a screwed shank $d^{15}$ fitting with a lock nut at the extremity of each of the clips by which they are attached. Upon the rear tubes of the planes D are pivotally mounted the altitude rudders E, which are inter-connected by a rod $e$ pivoted at $e^1$ and passing through a tube $e^2$ integral with the socket $d^4$ (Figs. 10 and 12). These elevating planes or rudders are each controlled by cables $e^4$ extending to the controlling lever $k^4$ (Fig. 1). The steering rudder F is pivoted at the end of the fuselage and receives its movement from cables $f$ extending to a foot-lever $f^1$ (Fig. 1).

In order to fold the planes D along the fuselage, it is only necessary to take down the struts $d^{14}$, to loosen the bolts $d^{11}$ of the collars $d^{10}$ and to turn back the planes into the position of Figs. 4, 5 and 6. To fit them up again, the inverse procedure is employed. When it is desired to alter the inclination of the planes D, the nuts $d^7$ are actuated in the required direction after having loosened the bolts $d^{11}$ and $d^{13}$. The length of the struts is thereby adjusted and the bolts $d^{11}$ and $d^{13}$ are then again clamped.

The apparatus is supported by two frames G each formed by two standards $g$ (Fig. 1) simply bolted upon the fuselage in such a way as not to project laterally and as to be readily detachable therefrom. These frames G are independent so that no rigid transverse connection can injure the fuselage in case of damage happening to the landing carriage. The standards $g$ are engaged in sockets $g^1$ connected to the landing skids H by slings $h$ (Figs. 20 and 21) located in notches $h^1$ in the skids and clamped thereon by bolts $h^2$.

Each skid bears upon its face which runs upon the ground a sole $h^3$ secured by claws $h^4$ secured by bolts; the front claw $h^4$ bears against the rear standards $g$ so that the sole cannot be torn away when rubbing on the ground. The rear standards $g$ carry jockey pulleys $k$ for the warping cables $k^1$ which extend to a lever $k^2$ integral with the shaft $k^3$ which may be revolved by the control lever $k^4$.

The cushioning arrangement which connects the axle of the wheels to the landing skids (Figs. 23, 24 and 25) has been combined, with a view to permitting the axle to move in a vertical plane, by joining it in an efficacious manner to the skids. In the majority of known arrangements of this kind the axle of the wheels, joined to the skids by elastic connections, is arranged at the extremities of plain connecting rods, jointed to a point on the landing frame; consequently when the elastic connections yield the axle describes an arc of a circle and does not remain in the same vertical plane. In other arrangements also known, the axle is merely connected to the skids by the elastic system and it is then insufficiently guided. These disadvantages are obviated by the aid of the arrangement which is the subject of the present invention in which the axle 1 of the wheels is connected to a fixed point 2 of each landing skid 3 by means of a double connecting rod 4—5 jointed at 2 and at 6; the rod 5 formed in the shape of a fork is fixed to the axle by means of a collar 7 pinned and soldered for example. Thongs or folds of indiarubber 8 arranged by the bolt heads 9 pass above the axle 1 and are maintained laterally by cheek plates 10 fixed to the axle. It will be understood that under these conditions the axle can move vertically and yet remain suitably guided.

Figs. 26 to 34 show one form of constructing the foot rail for controlling the steering rudder, designed so that its position may be adjusted according to the height of the pilot. This foot rail 11 can turn around a pivot 12 situated at its middle; this pivot 12 is mounted upon a plate 13 which rests upon a plate 14 fast to a tubular support 15 which is of T shape; the extremities of the horizontal portion of this support 15 are provided with collars 16 which are secured upon the longitudinal members of the fuselage by the aid of bolts which being exterior to the said members do not notch these latter. The plate 13 is provided with longitudinal grooves which can slide along fixation bolts fast to the plate 14. Thus by causing the plate B to slide upon the plate 14, one can regulate the distance separating the foot rail 11 from the pilot's seat 17 (Fig. 22) and secure the foot rail in this position by tightening the locking nuts. Since this adjustment modifies the length of the cables which control the rudder, it is necessary to alter the length of the latter at the same time. To effect this alteration, control cables 18 are fixed on drums or pulleys 19 arranged in blocks or clips 20 screwed by means of bolts to the foot rail 11. The groove of these pulleys, of which the details are shown in Figs. 30 and 31, is provided with an opening 21 in which the cable engages and this cable is held in a groove 22 by a washer 23 (Fig. 33) locked in position by a nut 24. The drum 19 is mounted on an axis 25 which cannot turn in the clip or block 20; this axis is furnished with a square 25' upon which engages a washer 26 serrated upon its lower face (Fig. 34); the central part of the drum in contact with the washer 26 is serrated in similar fashion so that the drum cannot twist or turn when the nut 27 is tightened.

Before proceding to the adjustment of the foot rail the nut 27 is slackened so as to relax the cables 18, and when the adjustment of the position of the foot rail is finished, the drums 19 are turned by hand to wind the cables in the groove; when the cables are suitably tensioned they are fastened by tightening the nuts 27. The arrangement for adjustment can be applied to any other control (warping, altitude, etc.).

In order to be able to modify more completely the distance separating the foot-rail 11 from the pilot's seat 17, this seat has been slung (see Fig. 22) from cables 28 the length of which can be altered by means of suitable devices; the seat can in this way be moved vertically and longitudinally and give it the position which best suits the height and fancy of the pilot.

It is advantageous at the time of tuning up the apparatus, to be able to vary slightly the inclination of the axis of the propeller relatively to the whole of the machine. Figs. 35, 36 and 37 show the arrangement employed to attain this result. The rear bearing 29 of the motor (Fig. 22) is mounted on a cross member or carline 30 which is furnished at its extremities with collars 31; these collars can slide along the standards 32 of the fuselage and be locked upon these standards by the screwing up of the bolts 33. In this way we can alter the height of the carline 30 that is to say the inclination of the axis of the motor and of the propeller; when a suitable position is attained the bolts 33 are screwed up and the cables of the St. Andrew's crosses 34 tightened (Fig. 22).

The longitudinal members of the fuselage are engaged at their rear extremities in sockets of general triangular shape 35 and 36 (Figs. 39 and 40) formed of cut sheet metal joined by autogenous soldering. The longitudinal members are maintained in the sockets 35 and 36 by means of corner pieces $35^a$ and $36^a$ of suitable shape (Figs. 39 and 40). The corner pieces $35^a$ and $36^a$ are themselves locked by screws $35^b$ and $36^b$ engaged in the metal part. The screws $35^b$ and $36^b$ carry at the same time caps to which are secured the metallic cross pieces $35^c$ and $36^c$ of the fuselage. The parts 35 and 36 are connected together by a tube 37 which carries the collars 38 for the turning of the steering rudder (Fig. 38). The tubes 39 around which turn the planes 40 of the rear horizontal empennage are gripped, when the apparatus is erected, by collars 41 of which Fig. 42 shows the details.

The levers of the altitude rudders and steering rudders are composed of two sheets of metal stamped out and soldered one to the other by autogenous soldering. Figs. 43, 44 and 45 show the detail of the lever 42 of the altitude rudder. This lever is composed of two shells of stamped sheet metal 43 which are soldered one to the other at their edges. Each of the shells 43 is composed of two parts of general triangular shape united together by a band or rim $43^a$. A tubular socket or ferrule 44 rigid with the united shells 43, receives one of the tubes of the rudder framework. The socket 44 is connected by autogenous soldering to the corresponding edge of the shells 43. The collar $43^a$ acts as a safety collar and supports the socket 44 in case of breakage of the soldered joints. The controlling wires are connected to the levers by clips 45, the bolt 46 of which is engaged in an eye 47 obtained by pressing or stamping.

The taking down and refitting of the apparatus described above may be effected very simply and rapidly even by unskilled labor, since there is no need to adjust or regulate any part. The majority of the parts subject to deterioration can be changed in a very short time and with the greatest facility.

What I claim and desire to secure by Letters Patent of the United States is:

1. An aeroplane having a body frame and supporting planes having spars socketed in said frame in adjusted position but capable of withdrawal by the lateral displacement of said planes, in combination with independent members jointed to said spars at their inner ends but retained in engagement with the body frame in the withdrawn position of the planes whereby said planes may be swung on their joint with said members into folded position.

2. An aeroplane having a body frame and supporting planes having spars socketed in said frame in adjusted position but capable of withdrawal by the lateral displacement of said planes, in combination with plugs hinged to the inner ends of said spars and swiveling in the body frame in the withdrawn position of the planes, whereby the latter may be swiveled with said plugs and swung into folded position, substantially as described.

3. An aeroplane having a body frame and supporting planes having spars socketed in said frame in adjusted position but capable of withdrawal by the lateral displacement of said planes, in combination with plugs hinged to the inner ends of said spars and swiveling in the body frame in the withdrawn position of the planes, whereby the latter may be swiveled with said plugs and swung into folded position, together with means to lock said plugs in position after the planes are folded, substantially as described.

4. An aeroplane having a body frame, supporting planes foldable thereon, and a pair of empennage planes at the rear of the frame, front and rear tubes $d$ and $d^3$ connecting said empennage planes, a fixed support $d^1$ in which said front tube freely turns, a socket $d^4$ rigid with said rear tube $d^3$, a tube on which said socket freely slides, hinges jointing said empennage planes to the body frame and slides for said hinges, substantially as described.

5. An aeroplane having a body frame, supporting planes foldable thereon, a pair of empennage planes hinged to said body frame, means for varying the angular position of said empennage planes and adjustable struts $d^{14}$ extending between said empennage planes and the body frame of the aeroplane.

In testimony whereof I have signed my name to this specification, in the presence of two subscribing witnesses.

HENRI HUBERT PAGNY.

Witnesses:
 JACQUES LEJEUNE,
 LÉON PEILLET.

---

Copies of this patent may be obtained for five cents each, by addressing the "Commissioner of Patents, Washington, D. C."